US006175402B1

(12) United States Patent
Sirasugi

(10) Patent No.: US 6,175,402 B1
(45) Date of Patent: Jan. 16, 2001

(54) SAFETY LOAD CONTROL APPARATUS AND METHOD

(75) Inventor: Kohzi Sirasugi, satte (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/232,680

(22) Filed: Jan. 19, 1999

(30) Foreign Application Priority Data

Jan. 19, 1998 (JP) .............................................. 10-021500

(51) Int. Cl.[7] .......................... G03B 27/52; G03B 27/72; G03B 27/32; G03G 15/00

(52) U.S. Cl. ................................ 355/40; 355/69; 355/77; 399/37

(58) Field of Search ................................ 355/40, 69, 77; 399/37, 42, 13; 347/111; 358/421, 422; 369/310, 205, 281

(56) References Cited

U.S. PATENT DOCUMENTS 5,710,955 * 1/1998 Nishimura et al. .................... 399/13

FOREIGN PATENT DOCUMENTS 5-19373 1/1993 (JP) .
5-49158 2/1993 (JP) .
5-289572 11/1993 (JP) .
6-130853 5/1994 (JP) .
61-175702 8/1996 (JP) .

* cited by examiner

*Primary Examiner*—Russell Adams
*Assistant Examiner*—Peter B. Kim
(74) *Attorney, Agent, or Firm*—Oblon, Spivak, McClelland, Maier & Neustadt, P.C.

(57) ABSTRACT

An image forming apparatus having a load control device which includes a load that executes a job, a relay that selectively connects the load with a power supply, and a central processing unit that outputs a plurality of control signals. Also included is an application specific integrated circuit that outputs a load driving signal to the load in response to a control signal sent from the central processing unit, an output condition observing device that observes an output condition of the application specific integrated circuit and a timer that counts pulses when the output condition is active and does not count pulses when the output condition is not active. In addition, the load stops driving when the timer has counted the prescribed number of pulses.

12 Claims, 11 Drawing Sheets

SAFETY LOAD CONTROL APPARATUS AND METHOD

BACKGROUND OF THE INVENTION

1. Field of the Invention

This invention relates to a load control apparatus for use in an image forming apparatus, such as a copier, a facsimile, a printer and a hybrid machine having a plurality of functions of the image forming apparatus, and in particular, relates to a load control apparatus capable of avoiding damage to a load of the image forming apparatus.

2. Discussion of the Background Art

A variety of technologies have been developed that avoid damage to a load, such as a motor and so on, by stopping the load in an emergency to keep the load operating safely. For example, the below-described technologies are well known.

As described in the Japanese Laid Open Patent Publication No. 5-286642, a sheet cassette in an image forming apparatus is moved by a motor between a setting position and a removing position. A sensor is provided to detect an obstacle that may exist between the setting position and the removing position. The motor is controlled to stop driving when the sensor detects the obstacle.

Further, as described in the Japanese Laid Open Patent Publication No. 5-304718, a sensor is provided to measure an amount of current. The sensor outputs a signal when a current larger than a rated current flows. A message or a mark indicating an overload state is displayed when the signal is output. A current fuse is then promoted to melt down, since the current flow is amplified through a safety circuit which avoids problems from occurring with parts of the motor.

Further, as described in the Japanese Laid Open Patent Publication No. 6-6996, a sensor is provided to detect a reverse revolution of a motor that drives a reciprocating device. The sensor outputs a signal when the motor does not revolve in a reverse direction within a prescribed time period after the reverse revolution is commanded. The motor is controlled to stop when the sensor does not output the signal.

In recent years, a plurality of motors, such as stepping motors, are increasingly employed in an image forming apparatus and so on. A base plate that supports the stepping motor is directly mounted on mold parts of the image forming apparatus. Thus, if for some reason the stepping motor is supplied with power for a long time, the stepping motor may generate heat, thereby having an abnormally high temperature. As a result, the mold parts may melt and become deformed. Further, the operational safety features required of the stepping motor may be lost.

In addition, if a central processing unit (hereinafter referred to as a CPU) of a microcomputer of the image forming apparatus controls a plurality of stepping motors by itself, almost all of the operations of the CPU are occupied by control operations for the stepping motors. Thus, a hardware circuit, such as an application specific integrated circuit (hereinafter referred to as an ASIC) has sometimes been recently employed to control the stepping motor for the CPU.

In a case of using such an ASIC, no problem occurs when a prescribed allowable amount of power supply voltage is applied having an alternating current (hereinafter referred to as AC), for example, which is more or less 15 percent of a rated voltage for the case of a copier.

However, if a plurality of copiers employing the ASIC are connected to an AC power supply constituted by one circuit, electrical power lower than the prescribed allowable range may be supplied to each of the copiers. Accordingly, a voltage, which is outside the allowable range, may be applied to the microcomputer and the ASIC. As a result, the microcomputer and the ASIC sometimes operate in an unexpected manner. For example, the ASIC may unexpectedly continue to output signals for driving the stepping motor.

SUMMARY OF THE INVENTION

Therefore, an object of the present invention is to provide an image forming apparatus having a novel load control apparatus. One example of an image forming apparatus having a load control device includes a load that executes a prescribed image forming process, a relay that selectively connects the load with a power supply, and a central processing unit that outputs a plurality of control signals. Also included is an application specific integrated circuit that outputs a load driving signal to the load in response to a control signal sent from the central processing unit, an output condition observing device that observes an output condition of the application specific integrated circuit, and a timer that starts counting pulses when the output condition is active and does not start counting pulses when the output condition is not active. In addition, the load stops driving when the timer has counted a prescribed time period.

In another embodiment, a load stops driving when a relay that connects a power supply with the load is turned OFF. The relay is turned OFF when a timer that counts pulses, during an active output condition of an application specific integrated circuit, has counted a prescribed time period.

In still another embodiment, a load stops driving when an initializing device initializes an application specific integrated circuit. The initializing device initializes the ASIC when a timer that counts pulses, during an active output condition of the ASIC, has counted a prescribed time period.

In still another embodiment, a load stops driving when a main power supply stops applying power to an application specific integrated circuit. The main power is stopped when a timer that counts pulses, during an active output condition of an ASIC, has counted a prescribed time period.

In still another embodiment, provided is an output condition observing device having a function of observing an operation condition of the image forming apparatus. A relay quickly disconnects the load with a power supply when a timer that counts pulses, during an active output condition of the application specific integrated circuit, has counted a prescribed time period and an image formation is not executing, or after the timer has counted the prescribed time period and the image formation has completed.

In still another embodiment, an initializing device initializes an application specific integrated circuit and a load stops driving only when a timer that counts pulses, during an active output condition of the application specific integrated circuit, has counted a prescribed time period and an image formation is not executing, or after the timer has counted the prescribed time period and the image formation has completed.

In still another embodiment, provided is an output condition observing device including a function of observing an operation condition of the image forming apparatus. A load stops driving only when a main power supply is not applied to the application specified integrated circuit, a timer that counts pulses, during an active output condition of the application specific integrated circuit, has counted a prescribed time period, and an image formation is not executing, or after the timer has counted the prescribed time period and the image formation has completed.

BRIEF DESCRIPTION OF THE DRAWINGS

For a better understanding of the invention as well as other objects and features thereof, reference is made to the following detailed description to be read in conjunction with the accompanying drawings, wherein.

DETAILED DESCRIPTION OF THE PREFERRED EMBODIMENTS

Figure 1:
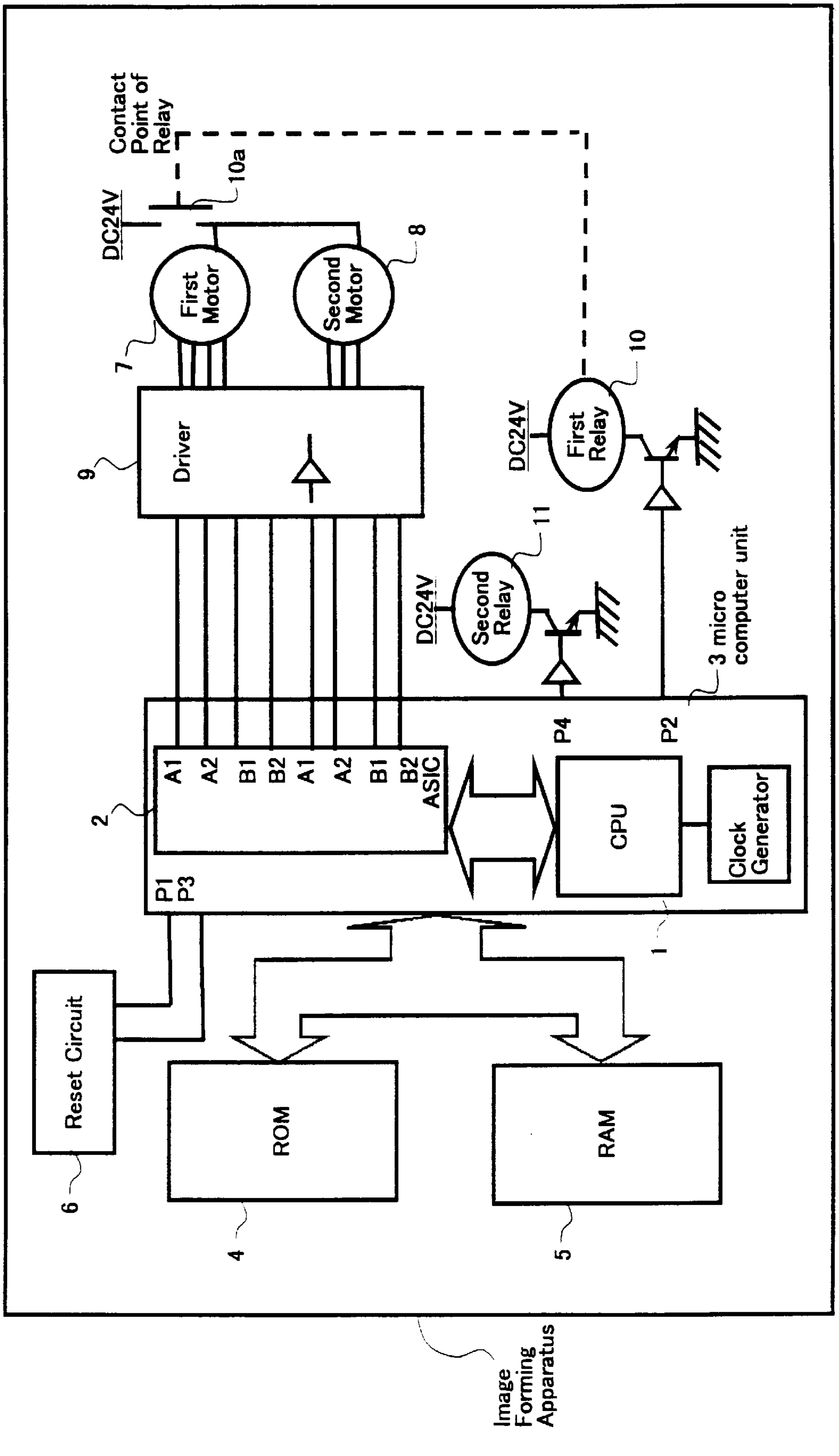
FIG. 1 is a block diagram that illustrates a load control apparatus of the present invention.

The embodiments of the present invention will now be explained, in which like reference numerals designate identical or corresponding parts throughout the several views.

An outline of a constitution of a load control apparatus of the present invention is illustrated in FIG. 1. The load control apparatus includes a microcomputer unit 3 having at least a CPU 1 and an ASIC 2. The ASIC 2 may receive signals for driving a stepping motor, indicating a revolution direction of the stepping motor, indicating a number of rounds per minutes (hereinafter referred to as rpm) of the stepping motor, and indicating an amount of moving distance of the stepping motor from the CPU 1. The ASIC 2 outputs a plurality of series of a rectangular wave signal to each of four coils of the stepping motor to keep the coils supplied with electrical power from their corresponding ports A1, A2, B1 and B2 to drive the stepping motor.

The ASIC 2 may change a form of the rectangular wave signal to change a revolution direction corresponding to the signal applied from the CPU 1. The ASIC 2 may also change a cycle of the rectangular wave in accordance with the signal indicating the number of rpm. The load control apparatus also includes a read only memory 4 (hereinafter referred to as a ROM 4) and a random access memory 5 (hereinafter referred to as a RAM 5), each connected to the microcomputer unit 3 by an address bus and a data bus.

The load control apparatus further includes a reset circuit 6 connected to both an input port P1 and an output port P3. In addition, the load control apparatus includes first and second stepping motors 7 and 8, and a driver 9 connected to both output ports A1, A2, B1 and B2 and the first and second stepping motors 7 and 8. The driver 9 drives the stepping motors 7 and 8. Also included are first and second relays 10 and 11 each respectively connected to output ports P2 and P4 of the microcomputer unit 3. Each of the first and the second relays 10 and 11 respectively turn a motor power supply and an AC power supply (not shown) ON and OFF for the image forming apparatus.

The ROM 4 may store a program that controls the load control apparatus. The RAM 5 may be used when handling and storing data during execution of the program's commands. The ASIC 2 outputs a rectangular wave signal to the driver 9 when driving the motors 7 and 8. The first relay 10 may close and open a contact point 10*a* of the relay under control of the microcomputer 3 to selectively connect a power supply line with the stepping motors 7 and 8. The second relay 11 may close and open a contact point of the relay, not shown, under a control of the microcomputer 3 to selectively connect an AC power supply line with the image forming apparatus.

The reset circuit 6 may have a function of observing a condition of the microcomputer 3 and a function of a reset timer. The observing function includes a function of determining if the ASIC 2 outputs a rectangular wave signal from its output ports and a function of determining if an image forming apparatus is at work. If the ASIC 2 outputs the signal from one of the ports, the observing function recognizes an output condition of the ASIC as active. If the ASIC 2 does not output any signal from each of the ports, the observing function recognizes the output condition as non-active.

Figure 2:
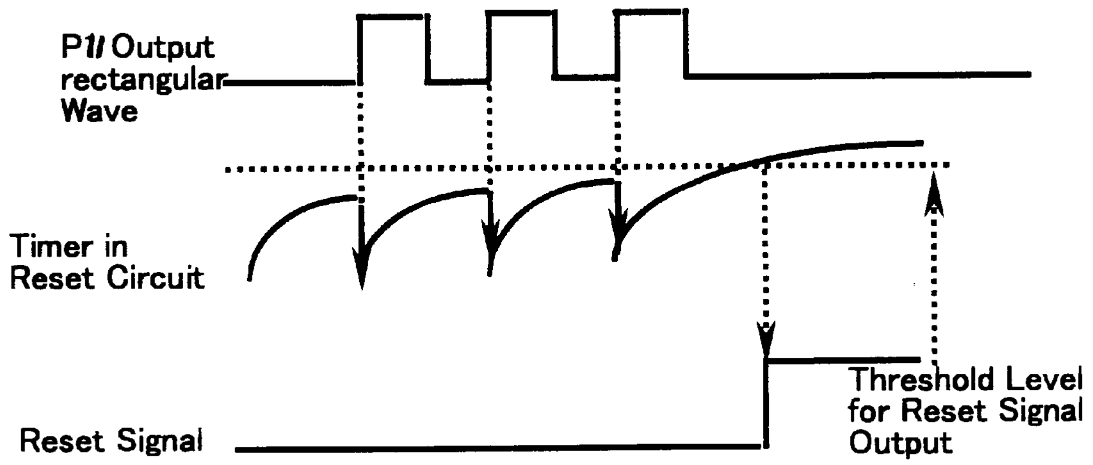
FIG. 2 is a timing diagram that illustrates timing of a reset signal generation by a reset circuit illustrated in FIG. 1.

When the microcomputer 3 normally operates, a rectangular wave P11 having a prescribed cycle, as illustrated in FIG. 2, may be output from the output port P1 to the reset circuit 6. If the microcomputer 3 abnormally operates in such a manner that the CPU 1 does not operate in accordance with a program stored in the ROM 4, the rectangular wave P11 is not output from the output port P1.

The reset timer installed in the reset circuit 6 may generate an exponential curve of voltage or current when the microcomputer unit 3 normally operates, and reset an amount of the voltage or current using the rectangular wave P11 as illustrated in FIG. 2. The reset timer may output a reset signal when the voltage or the current of the exponential curve is not reset by the rectangular wave P11. The reset signal is input to the input port P3 and then resets a status of the microcomputer unit 3 so that it may start from an initial state. The microcomputer unit 3 is also initialized by a reset signal when electrical power is first supplied from an AC power supply.

Since an amount the voltage or current of the exponential curve is reset by a rising portion or a dropping portion of the rectangular wave P11, as illustrated in FIG. 2, a reset signal is not output from the reset circuit 6 as long as the microcomputer unit 3 normally operates. A cycle of the rectangular wave P11 may be determined to be smaller than a time when the exponential curve reaches a threshold level illustrated in FIG. 2.

Figure 3A:
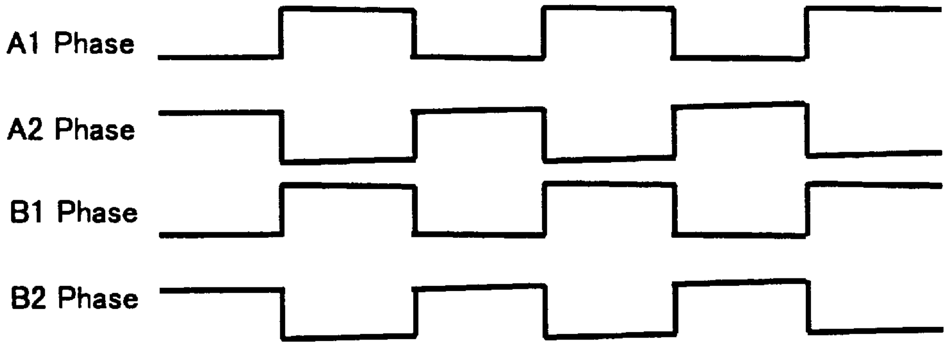
FIG. 3A and 3B are timing diagram that illustrates an output timing of each series of a rectangular wave signal for the driving motors illustrated in FIG. 1.
Figure 3B:
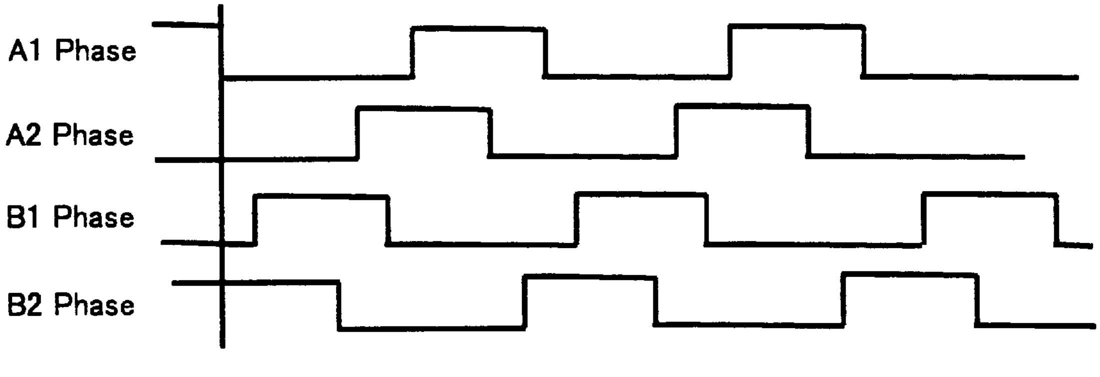

A four-phase type stepping motor having four coils is utilized for each of the motors 7 and 8. The stepping motor is driven when four series of a rectangular wave signal are respectively input to the corresponding four coils. To output four series of a rectangular wave signal, four output ports A1, A2, B1 and B2 of the ASIC 2 may be respectively connected to a plurality of stepping motors. A timing diagram that illustrates an output timing of the rectangular wave signal for driving the stepping motors 7 and 8 is illustrated in FIGS. 3A and 3B. A waveform of the rectangular wave illustrated in FIG. 3A is generally called a two phase excitation driving waveform. A one-two phase excitation driving waveform, as illustrated in FIG. 3B, can be used for the two phase excitation driving.

A current may flow through the first relay 10 when a high value signal is generated by a logic circuit, not shown, disposed in the microcomputer 1, and is output from the port P2. The contact point of the relay **10*a* then closes the power supply line so that a 24 volt power supply may supply direct current (hereinafter referred to as DC) to the stepping motors 7 and 8. Thus, the stepping motors 7 and 8 are ready to be driven. When, the output signal from the port P2 has a low value, the contact point of the relay 10*a* opens the power supply line, since current does not flow through the first relay 10, and accordingly, the stepping motors 7 and 8** are not ready to be driven.

Figure 4:
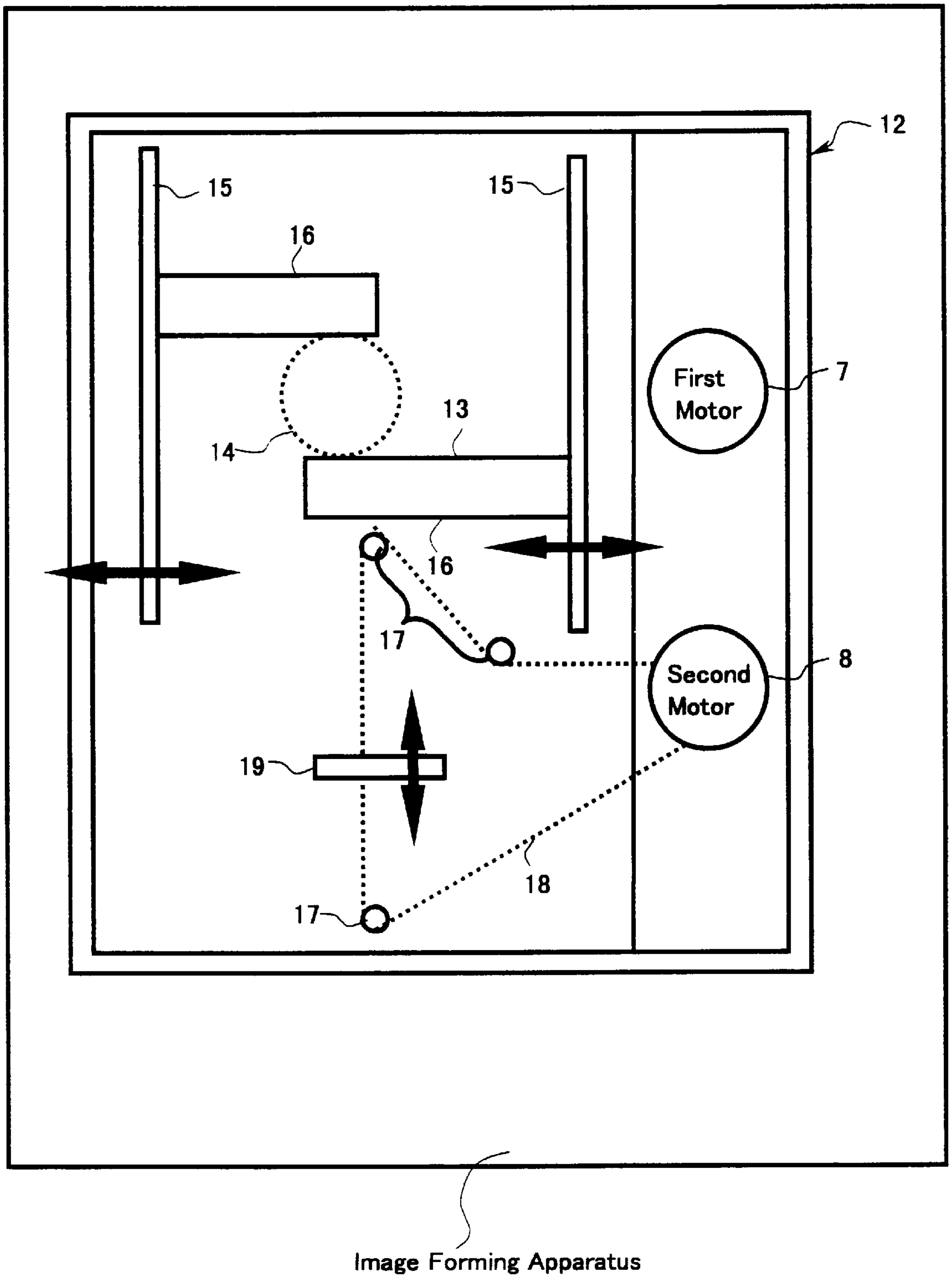
FIG. 4 is a schematic view that illustrates a sheet feeding unit having motors illustrated in FIG. 1, which is used in a duplex copier.

One example of using stepping motors is illustrated in FIG. 4. The stepping motors may be employed in a duplex copysheet feeding unit 12 of an image forming apparatus, which includes side fences and an end fence each for aligning side edges of a received copysheet having a toner image on one side.

When the first motor 7 is driven, a side fence moving belt 13 wound around an axis of the first motor 7 rotates a side fence driving gear 14 in a specified direction. A pair of racks 16 mount the side fences 15 and mesh with the side fence driving gear 14 from an opposite side.

Thus, when the stepping motor 7 is driven, the pair of the side fences 15 may simultaneously move in opposite directions. The side fences 15 may narrow and expand a distance between both side fences corresponding to rotational directions of the stepping motor 7.

When the second motor 8 is driven, an end fence moving belt 18 wound around an axis of an end fence driving pulley 17 moves the end fence 19 in a specified direction. Thus, when the stepping motor 8 is driven, the end fence 19 may move back and forth corresponding to rotational directions of the stepping motor 8.

Figure 5:
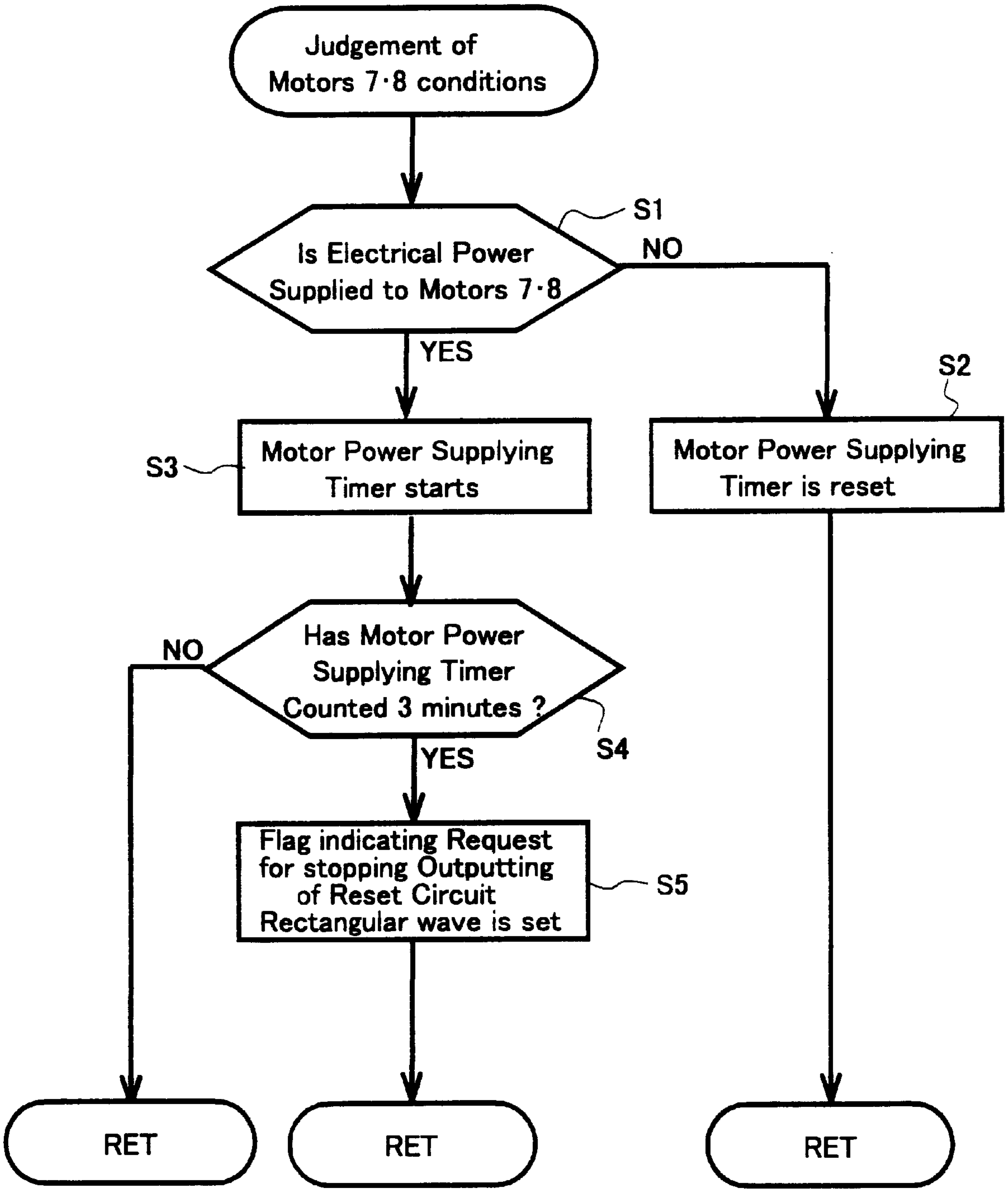
FIG. 5 is a flowchart that illustrates a process of determining if electrical power is applied to the motors illustrated in FIG. 1 by observing a signal output condition of an ASIC using an observation function of the reset circuit illustrated in FIG. 1.

Hereinbelow, embodiments of the load control apparatus of the present invention are explained in detail referring to FIGS. 5 through 11. First, FIG. 5 explains a determination process that determines if electrical power is supplied to the first and second stepping motors 7 and 8 using an observing function of the reset circuit 6. As illustrated in FIG. 5, it is determined in step S1 if at least one of the output ports A1, A2, B1 and B2 of the ASIC 2 outputs a rectangular wave signal.

If none of the ports A1, A2, B1 and B2 output a rectangular wave signal, a motor power supply timer included in the CPU 1, as illustrated in FIG. 1, is reset in step S2. This is because a problem likely has not occurred in the microcomputer 3. If at least one port outputs a rectangular wave signal, a motor power-supply timer starts counting pulses output from a clock generator illustrated in FIG. 2.

In step S4 it is determined if the motor power supply timer has counted, for example, up to three minutes, that is regarded as an upper limit for the ASIC 2 to be normally operating. If the motor power supply timer has counted up to three minutes, a flag that demands a stop of an output of a rectangular wave P11 from the output port P1 to the reset circuit 6 is set in step S5. This is because a problem may have occurred in the microcomputer unit 3, and accordingly the loads may be damaged. The step then returns to a main routine in a step indicated by "RET" illustrated in FIG. 5 (hereinafter, a step indicated by "RET" in the Figures means the same thing). The above-mentioned determining process is repeated as long as the electrical power supply continues to be applied to the image forming apparatus.

When a prescribed job to be performed by the stepping motors 7 and 8 is completed, and accordingly electrical power is stopped from being supplied to the stepping motors 7 and 8 before elapsing of three minutes, the motor power supply timer is reset. This means that the prescribed job has safely completed. The above-mentioned reset operation is executed, for example, by a program stored in the ROM 4 by rewriting a time value of zero on a prescribed amount of time value stored in the RAM 5. A length of time of the motor power supply timer can be determined at a level longer than a time period required for the load to complete its job.

Figure 6:
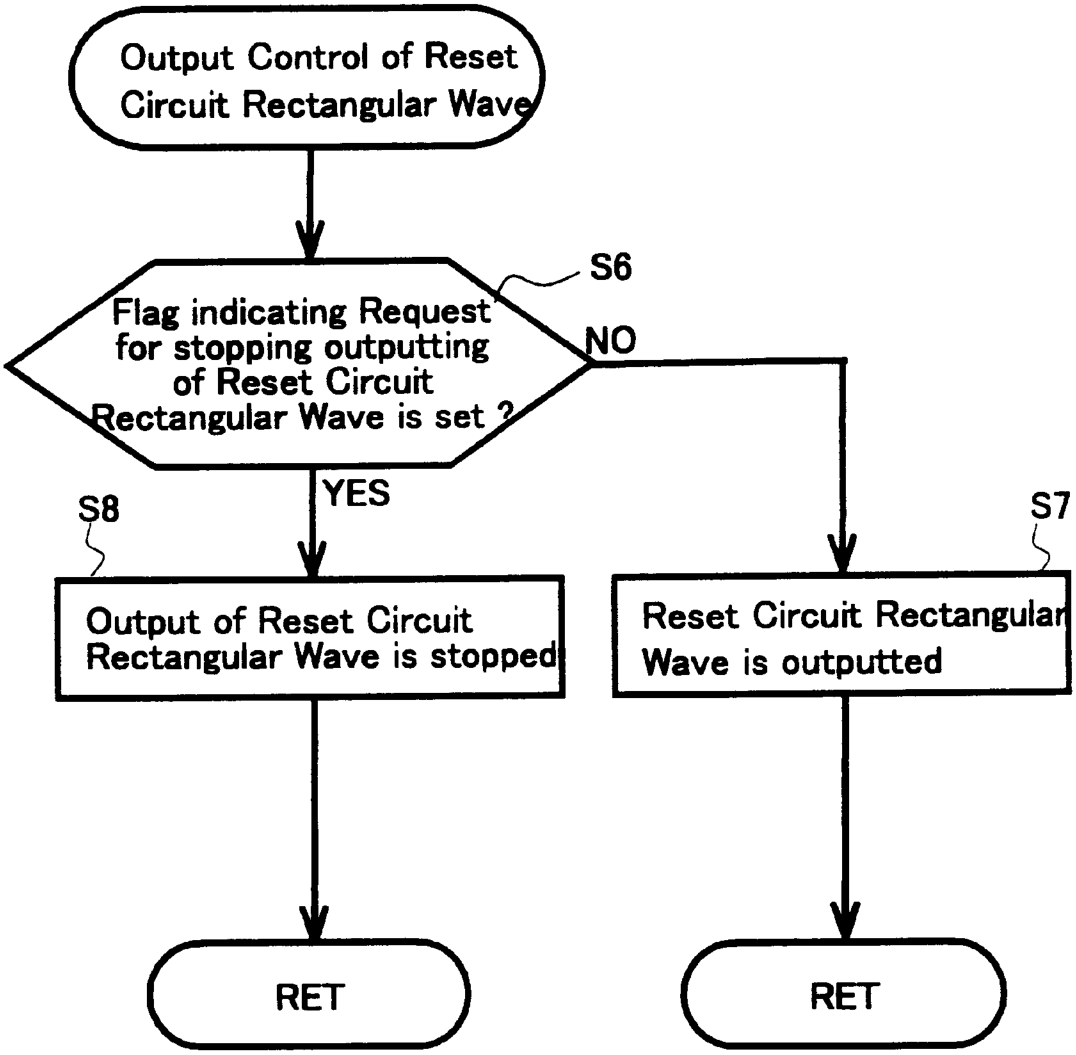
FIG. 6 is a flowchart that illustrates a control process of an output of a rectangular wave from an ASIC to the reset circuit illustrated in FIG. 1 depending on a determination if a flag is set as illustrated in FIG. 5.

A control process after the determination if the flag is set in step S5 is illustrated in FIG. 6. As illustrated in FIG. 6, it is determined in step S6 if the flag is set. If the flag is not set, the rectangular wave P11 continues to be output from the ASIC 2 to the reset circuit 6 in step S7. If the flag is set, the output of the rectangular wave P11 is stopped in step S8. The reset circuit 6 then generates and outputs a reset signal as illustrated in FIG. 2 to the microcomputer unit 3 through the port P3. Both the ASIC 2 and the CPU 1 are then reset and restart operations. Since the ASIC 2 is reset when the reset signal is input to the microcomputer unit 3, a rectangular wave signal that drives the driver 9 is not output from each of the ports A1, A2, B1 and B2. Each of the stepping motors 7 and 8 then stop, even if the DC power supply is applied to the motors, since the signal is not applied to the driver 9. The above-mentioned process is repeated as long as the electrical power is supplied to the image forming apparatus.

Hereinbelow, a slightly modified embodiment of the load control apparatus is explained referring to FIG. 7.

Figure 7:
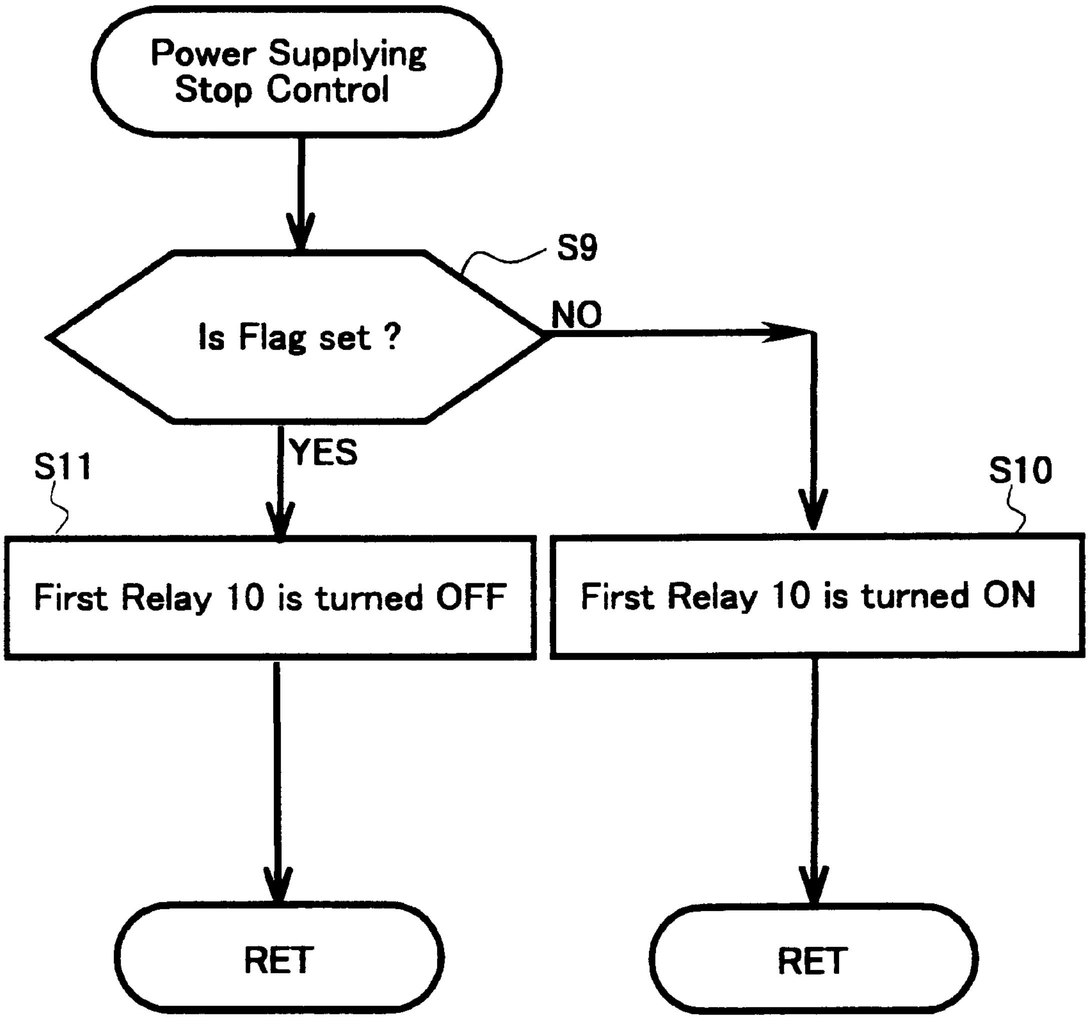
FIG. 7 is a flowchart that illustrates a control process of applying a power supply to motors by controlling a first relay that selectively connects a power supplying line with the motors depending on the determination of a flag as illustrated in FIG. 5.

As illustrated in FIG. 7, it is determined in step S9 if the flag is set in step S5. If the flag is not set, the first relay 10 is turned ON so that the contact point **10*a* closes, and accordingly the electrical power supply line is connected with the motors 7 and 8 in step S10. If the flag is set, the first relay 10 is turned OFF so that the contact point 10*a* opens, and accordingly the electrical power supplying line is disconnected with the motors 7 and 8 in step S11. Thus, when the ASIC 2 or CPU 1 abnormally operates, namely, the motor power supply timer has counted up to three minutes, the motors 7 and 8** stop driving.

Figure 8:
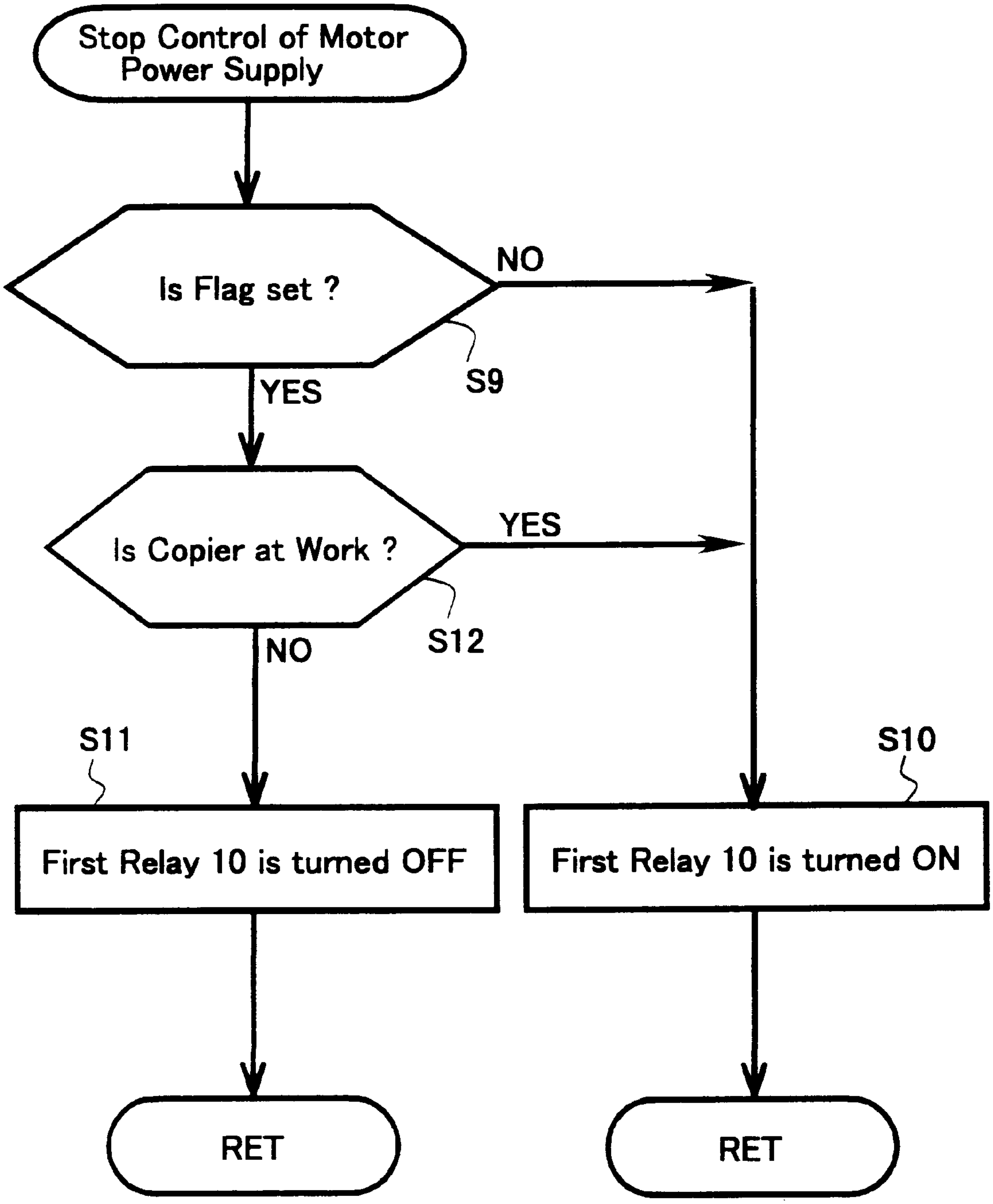
FIG. 8 is a flowchart that illustrates a control process of applying a power supply to motors, which slightly modifies the control process illustrated in FIG. 7, by adding a step which determines if a copier is at work.

Hereinbelow, another embodiment of the load control apparatus is explained referring to FIG. 8. A control process illustrated in FIG. 8 is similar to that of FIG. 7 except for a step S12. As illustrated in FIG. 8, it is determined in step S12 if an image forming apparatus, such as a copier, is at work. If the image forming apparatus is at work, the first relay 10 is not turned OFF in step S10, even if the flag is set in step S9. This is because a sheet may jam, for example, in the duplex sheet-feeding tray if the motors 7 and 8 quickly stop. When the image formation is then completed, the motors 7 and 8 may stop. If it is determined that the image forming apparatus is not at work in step S12, the first relay 10 is turned OFF in step S11. The determination if the copier is at work may be executed, for example, by a program stored in the ROM 4 by determining a condition, for example, of a display of a copy start key, not shown, that differently displays something depending on operational conditions. The copy start key generally is displayed in red when the copier is at work and in blue when in a copy waiting mode.

Figure 9:
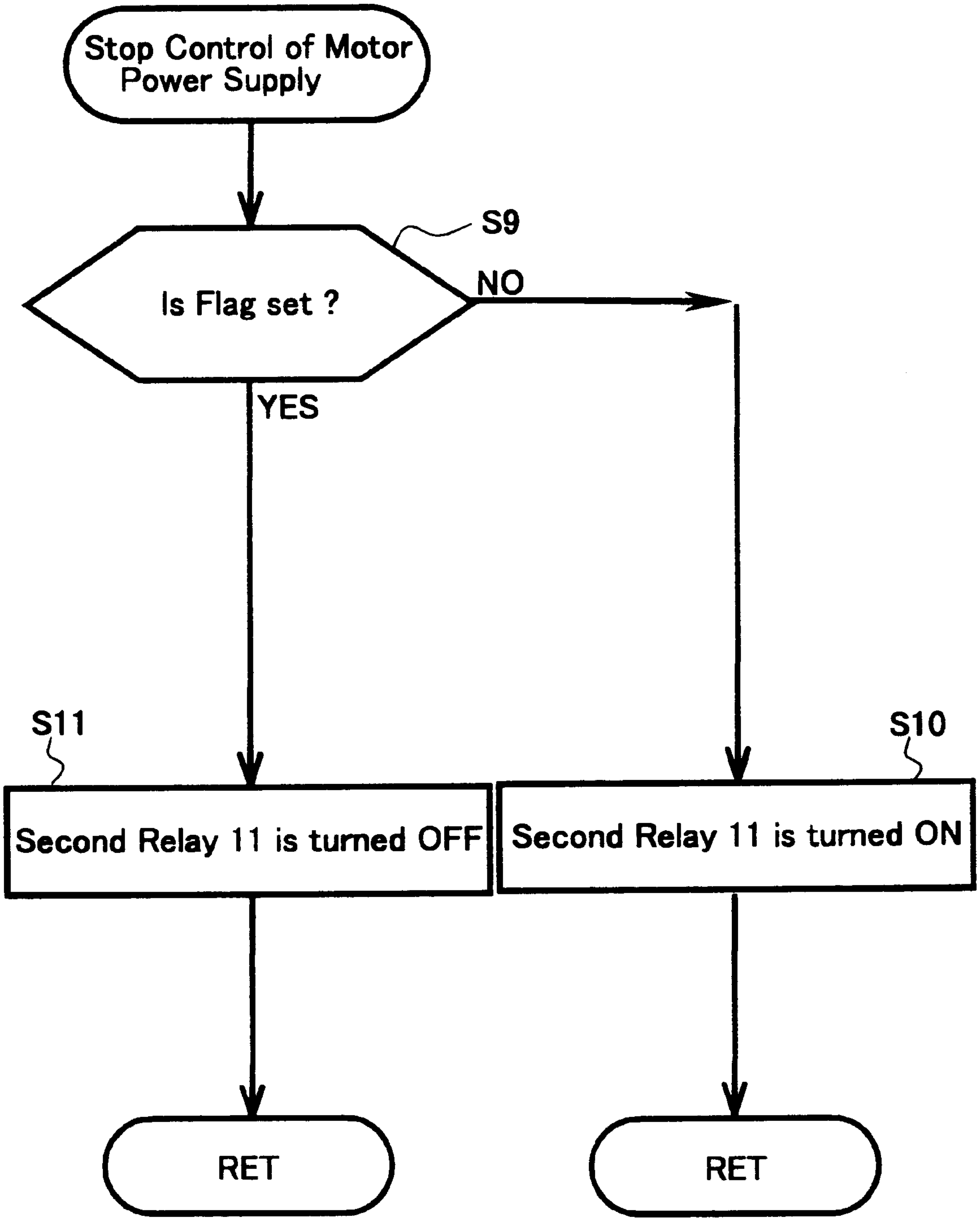
FIG. 9 is a flowchart that illustrates a control process of applying a power supply to a copier by selectively activating a second relay that may connect a power supplying line with the copier depending on the determination of a flag as illustrated in FIG. 5.

Hereinbelow, still another embodiment of the load control apparatus is explained referring to FIG. 9. Since a control process of this embodiment is similar to the control process using the first relay 10 illustrated in FIG. 7, a second relay 11 is controlled almost in a same manner as the first relay 10 as explained earlier referring to FIG. 7. Therefore, if the flag is set in step S9, the second relay 11 is turned ON in step S10. Thus, electrical power is applied to the image forming apparatus, and accordingly the stepping motors 7 and 8 are driven. If the flag is not set in step S9, the second relay 11 is turned OFF in step S11. Thus, the electrical power is stopped from being supplied to the image forming apparatus, and accordingly the stepping motors 7 and 8 stop driving.

Figure 10:
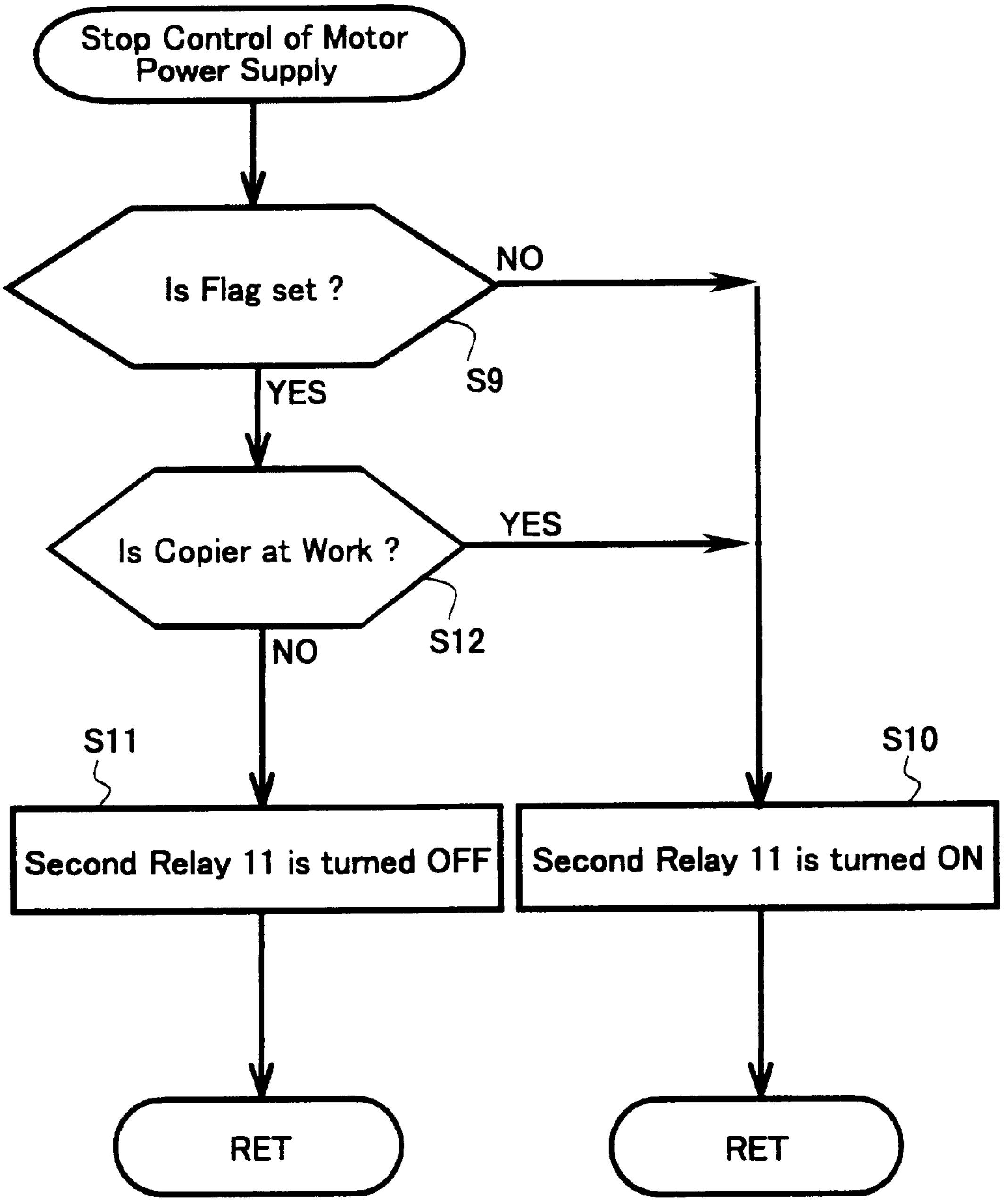
FIG. 10 is a flowchart that illustrates a control process of applying a power supply to a copier, which slightly modifies the control process illustrated in FIG. 9, by adding a step which determines if the copier is at work.

Hereinbelow, still another embodiment of the load control apparatus is explained referring to FIG. 10. Since, a control process of this embodiment is similar to the control process illustrated in FIG. 8, the second relay 11 is controlled almost in a same manner as the first relay 10 illustrated in FIG. 8. Thus, if it is determined that the copier is at work in step S12, electrical power is not stopped from being supplied to the image forming apparatus in step S10. When the copier completes its work, the stepping motors 7 and 8 stop driving. Further, if it is determined that the copier is not at work in step S12, the electrical power is stopped from being supplied to the image forming apparatus in step S11.

Figure 11:
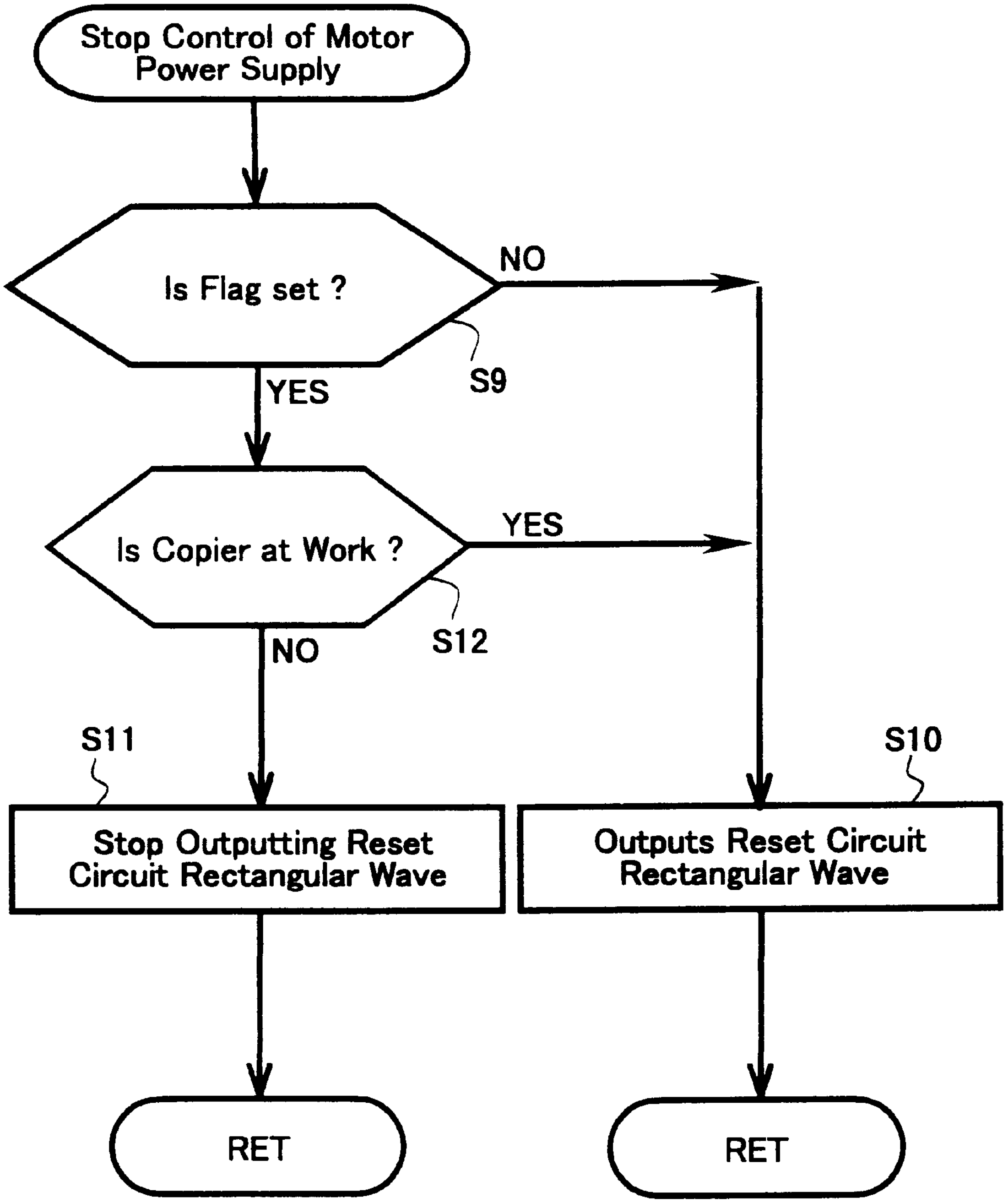
FIG. 11 is a flowchart that illustrates a control process of applying a power supply to motors by selectively stopping an output of a rectangular wave from an ASIC to a reset circuit illustrated in FIG. 1, which may reset the ASIC depending on the determination of a flag as illustrated in FIG. 5.

Hereinbelow, still another embodiment of the load control apparatus is explained referring to FIG. 11. A control process that controls an output of the rectangular wave P11 from the ASIC 2 is illustrated in FIG. 11. A control process of this embodiment is similar to the control process illustrated in FIG. 9 except for steps S10 and S11. If it is determined that the copier is at work in step S12, a rectangular wave continues to be output to the reset circuit 6 in step S10, even when the flag is set in step S9. The reason why the rectangular wave P11 continues to be output even when the flag is set is the same as mentioned earlier. If it is determined that the copier is not at work in step S12, the rectangular wave P11 may be discontinued from being output from the microcomputer 3 to the reset circuit 6 in step S11. The reset circuit 6 then outputs a reset signal to the microcomputer unit 3, thereby stopping output from the microcomputer to the driver 9, and stopping the driving motors 7 and 8. If it is determined that the copier is at work in step S12, the rectangular wave P11 may continue to be output from the microcomputer 3 to the reset circuit 6 in step S10. Thus, the stepping motors 7 and 8 continue a prescribed job. When the copier completes the prescribed job, the rectangular wave P11 is stopped from being output.

Obviously, numerous additional modifications and variations of the present invention are possible in light of the teachings. It is therefore to be understood that within the scope of the appended claims, the present invention may be practiced otherwise than as specifically described herein.

The present application is based on Japanese priority document 10-21500, the contents of which are incorporated by reference.

What is claimed as new and desired to be secured by Letters Patent of the United States is:

1. An image forming apparatus having a load control device comprising:

a load configured to execute a prescribed job;

a relay configured to selectively connect said load with a power supply;

a central processing unit configured to output a plurality of control signals;

an application specific integrated circuit configured to output a load driving signal to said load corresponding to said plurality of control signals sent from said central processing unit;

an output condition observing device configured to observe an output condition of said application specific integrated circuit and to observe an operation condition of said image formation apparatus; and a timer configured to count pulses when said output condition is active and not to count pulses when said output condition is not active, wherein said load stops driving only when said timer has counted a prescribed number of pulses and an image formation is not executing, or after said timer has counted the prescribed number of pulses and said image formation has completed.

2. An image forming apparatus as claimed in claim 1, wherein the stopping of the load is executed by turning said relay off when said timer has counted the prescribed number of pulses.

3. An image forming apparatus as claimed in claim 1, further comprising:

an initializing device configured to initialize said application specific integrated circuit, wherein the stopping of the load is executed by initializing said application specific integrated circuit when said timer has counted the prescribed number of pulses.

4. An image forming apparatus as claimed in claim 1, wherein the stopping of the load is executed by stopping a main power supply to be applied to said application specific integrated circuit when said timer has counted the prescribed number of pulses.

5. An image forming apparatus having a load control device comprising:

load means for driving a prescribed job;

relay means for selectively connecting said load means with a power supply;

central processing means for outputting a plurality of control signals;

application specific integrated circuit means for outputting a load driving signal to said load means corresponding to said plurality of control signals sent from said central processing means;

output condition observing means for observing an output condition of said application specific integrated circuit means and for observing an operation condition of the image forming apparatus;

timer means for counting pulses when said output condition is active and for not counting pulses when said output condition is not active; and means for stopping a driving of the load only when said timer means has counted a prescribed number of pulses and an image formation is not executing, or after said timer means has counted the prescribed number of pulses and said image formation has completed.

6. An image forming apparatus as claimed in claim 5, wherein the stopping of the power supply is executed by turning said relay means off when said timer means has counted the prescribed number of pulses.

7. An image forming apparatus as claimed in claim 5, further comprising:

initializing means for initializing said application specific integrated circuit means, wherein the stopping of the load is executed by initializing said application specific integrated circuit means when said timer means has counted the prescribed number of pulses.

8. An image forming apparatus as claimed in claim 5, wherein the stopping of the load means is executed by stopping a main power supply to be applied to said application specific integrated circuit means when said timer means has counted the prescribed number of pulses.

9. An image forming method comprising the step of:

applying a power supply to a load;

driving said load when a driving signal is sent from an application specified integrated circuit to the load;

observing an output condition of an application specified integrated circuit and an operation condition of an image forming apparatus;

starting a timer when said output condition is active; and stopping said power supply from being applied to said load only when said timer has counted a prescribed number of pulses and an image formation is not executing, or after said timer has counted the prescribed number of pulses and said image formation has completed.

10. An image forming method as claimed in claim 9, wherein:

the step of stopping the power supply is executed by turning off a relay that connects the load with the power supply when said timer has counted the prescribed number of pulses.

11. An image forming method as claimed in claim 9, wherein the step of stopping the load is executed by initializing said application specific integrated circuit when said timer has counted the prescribed number of pulses.

12. An image forming method as claimed in claim 9, wherein the step of stopping the load is executed by stopping a main power supply to be applied to said application specific integrated circuit when said timer has counted the prescribed number of pulses.

* * * * *